(12) United States Patent
So et al.

(10) Patent No.: US 6,628,419 B1
(45) Date of Patent: Sep. 30, 2003

(54) IMAGE FORMING DEVICE

(75) Inventors: Ikken So, Nakai-machi (JP); Shunichi Kimura, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/515,655

(22) Filed: Feb. 29, 2000

(30) Foreign Application Priority Data

Mar. 12, 1999 (JP) ............................................ 11-066010

(51) Int. Cl.$^7$ .......................... G06F 15/00; G06F 13/00
(52) U.S. Cl. ..................... 358/1.16; 358/1.18; 358/515; 382/162; 382/164; 382/166; 382/232; 382/234; 382/710; 382/2
(58) Field of Search .............................. 358/1.16, 1.18, 358/515; 382/234, 162, 164, 166, 232; 710/2

(56) References Cited

U.S. PATENT DOCUMENTS

| | | | | |
|---|---|---|---|---|
| 5,631,849 A | * | 5/1997 | Wallace .................. | 375/240.12 |
| 6,118,898 A | * | 9/2000 | Chen et al. .................. | 382/232 |
| 6,272,252 B1 | * | 8/2001 | Eldridge et al. ............. | 382/232 |
| 2001/0043747 A1 | * | 11/2001 | Inuzuka et al. .............. | 382/235 |

FOREIGN PATENT DOCUMENTS

JP  5-31974  2/1993

* cited by examiner

*Primary Examiner*—Edward Coles
*Assistant Examiner*—Alan Rahimi
(74) *Attorney, Agent, or Firm*—Morgan, Lewis & Bockius LLP

(57) ABSTRACT

In a tandem-type full color printer, to print monochromatic image data the resolution of which is high and the processing load of which is high at high speed and at a low cost, the operation of each component is required as follows. If a monochromatic image is printed, MB images acquired by dividing the monochromatic image by an image processor are sequentially sent to the respective image compressors for YMCK. Four image compressors are operated in parallel and the compressed data of MB images is stored in an image storage. After the data of all MB images required for an output image is stored, an MB image controller operates the respective image decompressors for YMCK in parallel and sends the stored data to the image decompressors. The decompressed MB images are coupled to one image data in an image coupler and are sent to a print unit. The MB image controller enhances process speed for carrying paper in the print unit based upon a situation in which MB images are decoded by amount in which the processing speed of a monochromatic image is enhanced.

11 Claims, 5 Drawing Sheets

FIG.3 CASE THAT SCHEDULING PROCESSING BASED UPON COMPRESSION RATE IS EXECUTED IN DECOMPRESSION FOR YMCK

IMAGE FORMING DEVICE

BACKGROUND OF THE INVENTION

1. Field of the Invention

The present invention relates to an image forming device wherein both a monochromatic image and a full color image can be printed and in addition, the editing, the compression and the expansion of an image for every small area can be repeated, particularly relates to an image forming device wherein the print speed of monochromatic image data is enhanced at a low cost.

2. Description of the Related Art

For a device that forms a color image at high speed, as shown in FIG. 4, there is one wherein paper is carried using a printing head including a recorder dedicated to each of YMCK and each recorder is operated according to pipeline at the speed of a process. In such configuration, a controller for supplying an image is required to supply 4-color image data to each recorder at the speed of a process. As the controller is required to supply image data asynchronously passed from an image generator at the speed of a process, a general method is one with steps of once compressing and storing an image and supplying its image data at the speed of a process decompressing it.

In such an image forming device (a full color page printer), processing is normally executed as follows. As shown in FIG. 4, (1) an image generator 1 first interprets an input file described in page description language (PDL) and others and generates an image. (2) An image processor 2 executes image editing processing including turning, scaling and substituting, color conversion (from RGB to YMCK) and others. (3) An image compressor 3 provided for every color component compresses and encodes an image for every color component. (4) An image storage 4 stores a compressed image for every color component. (5) An image decompressor 5 provided for every color component decompresses the corresponding compressed image. (6) A print head 7 prints the decompressed image.

Normally, in image processing shown in (2) such as image editing processing and color conversion, a page memory is required at least for every color component. As the page memory increases the cost, a method of using the image storage 4 in place of the page memory used by the image processor 2 is proposed. In this case, as image data to be processed is stored in the image storage 4 with it compressed, the compressed image is decompressed, is fed back to the image processor 2 as shown by a broken line in FIG. 4, image processing is applied to the decompressed image, afterward, the decompressed image is compressed again and is written in image storage 4. That is, the image compressor 3 and the image decompressor 5 are required to be used together, executing image editing processing and others.

For an example of this method in prior art, technique disclosed in Japanese Published Unexamined Patent Application No. Hei 5-31974 will be described. In the above example of prior art, a macroblock (hereinafter called MB) image acquired by dividing an image into small rectangular areas is adopted as an edited object. Editing processing is applied to the MB image for every image editing command described in PDL, and compression and storage are repeated. In the case of overlap with an MB image to be a background in substitute processing and others, the data of the corresponding MB image is generated by decompressing stored compressed data referring to an MB management table. FIG. 5 schematically shows the above processing and in this example, the respective images of YMCK are treated in units of MB image labeled as (1) to (6), are compressed in units of MB image by the image compressor 3 and are stored in the image storage 4. The decompressor 5 decompresses the image in units of MB image. If image processing such as substitute is required, the corresponding MB image is decompressed and is fed back to the image processor 2.

If the image processing in above (2) and the compression of an image in above (3) are executed without dividing an image into MB images in this method, the cost required for a page memory is reduced, however, if an image in a slight area is overwritten, all images to be a background are also required to be decompressed and the processing speed is reduced. Therefore, if the image processing in above (2) and the compression processing in above (3) are executed in units of MB image in a page printer, the reduction of the cost and the processing speed can be balanced.

If a black-and-white binary image or an only black monochromatic multivalued image is printed in the above printer, the same printing speed as that of a color image is realized using only an image processing path for K. However, as improvement for the resolution of a binary image or a monochromatic multivalued image (hereinafter these will be called a monochromatic image) is more and more demanded, the information capacity of these becomes equal to that of a color image. For example, for the information capacity of a color image on a full raster in A4 size according to JIS, if the resolution is 600 dots/25.4 mm and the gradation precision is 8 bits/pixel, the data amount for one color is approximately 35 MB.

In the meantime, for the information capacity of a binary image in the same size, if the resolution is 9600 dots/25.4 mm and the gradation precision is 2 bits/pixel, the data amount for one color is approximately 70 MB. Also, for a monochromatic multivalued image, if the resolution is 1200 dots/25.4 mm and the gradation precision is 8 bits/pixel, the data amount for one color is similarly approximately 70 MB and they have double information capacity, compared with the information capacity for one color of a color image.

If the compression and expansion of an image are implemented by hardware such as ASIC, the number of pixels processed per unit time (throughput) is fixed because of the character of a pipeline implemented by ASIC. Therefore, in such a printer according to a tandem system, if a monochromatic image having double information capacity compared with that of a color image is printed, image data cannot be supplied unless process speed at which paper is carried is halved and blank paper or paper printed halfway is output.

In an example of prior art, the reduction of a cost and high processing speed are balanced by executing image processing in above (2) and compression processing in above (3) for every MB in a full color page printer.

However, for a monochromatic image, there is a problem that the load of compression processing in above (3) and expansion processing in above (5) is large, hardware dedicated to a monochromatic image is required to be added to enhance processing speed and the cost and processing speed cannot be balanced.

SUMMARY OF THE INVENTION

The present invention has been made to solve the above problems and provides a method of printing a monochromatic image at faster speed than that of a color image without greatly increasing the cost and balancing the low cost and high processing speed in a full color printer according to a tandem system.

First, referring to FIG. 1, the present invention will be roughly described below.

In an image forming device according to the present invention, if a monochromatic image is printed, an MB image divided by an image processor is sequentially sent to the respective image compressors for YMCK. Four image compressors are operated in parallel and the compressed data of an MB image is stored in an image storage. After the data of all MB images required for an output image is stored, an MB image controller operates the respective image decompressors for YMCK in parallel and sends the stored data to the image decompressors. The decompressed data of MB images spatially divided is coupled to one image data by an image coupler and is sent to a print head.

The MB image controller can enhance process speed at which paper is carried in the print head by amount in which the processing speed of a monochromatic image is enhanced according to a situation in which an MB image is decoded.

The present invention will be further detailedly described. According to the present invention, an image forming device which can print a full color image is provided with: an image processor for converting an image to a final printout image in units of small area; plural image compressors for receiving the image in units of small unit from the above image processor and compressing it; an image storage for storing the compressed image transferred from the above image compressor; plural image decompressors for decompressing the compressed image stored in the above image storage in units of small area; a temporary image storage for temporarily storing the image decompressed by the above image decompressor; a print head for printing the image stored in the above image buffer by the corresponding recorder for every component; and a small area image transfer controller for allocating and transferring the image in the units of small area transferred from the above image processor to the plural image compressors according to whether the image is monochromatic or a full color and allocating and transferring the compressed image stored in the above image storage to the plural image decompressors in the units of small area. The above small area image transfer controller controls the transfer of an image in the units of small area by compressing an image in units of small area for every color component by the image compressor corresponding to the color component and further, decompressing it by the image decompressor corresponding to the color component in case an image to be printed is a full color and compressing a monochromatic image in units of small area by the respective plural image compressors in parallel and further, decompressing it by the plural image decompressors in parallel in case an image to be printed is monochromatic.

In the above configuration, as resources for compressing and decompressing in colors other than the following color component (not normally used for printing a monochromatic image) are used for compressing and decompressing the monochromatic image when the monochromatic image is printed, high speed processing can be implemented at a low cost by the amount. Even if an image to be printed is a monochromatic image having high resolution, it can be printed at speed equal to or faster than a normal full color image. The above monochromatic image includes a binary image and a multivalued image (a gray scale).

BRIEF DESCRIPTION OF THE DRAWINGS

The preferred embodiment of the present invention will be described in detail based upon the followings, wherein.

DETAILED DESCRIPTION OF THE PREFERRED EMBODIMENT

Figure 1:
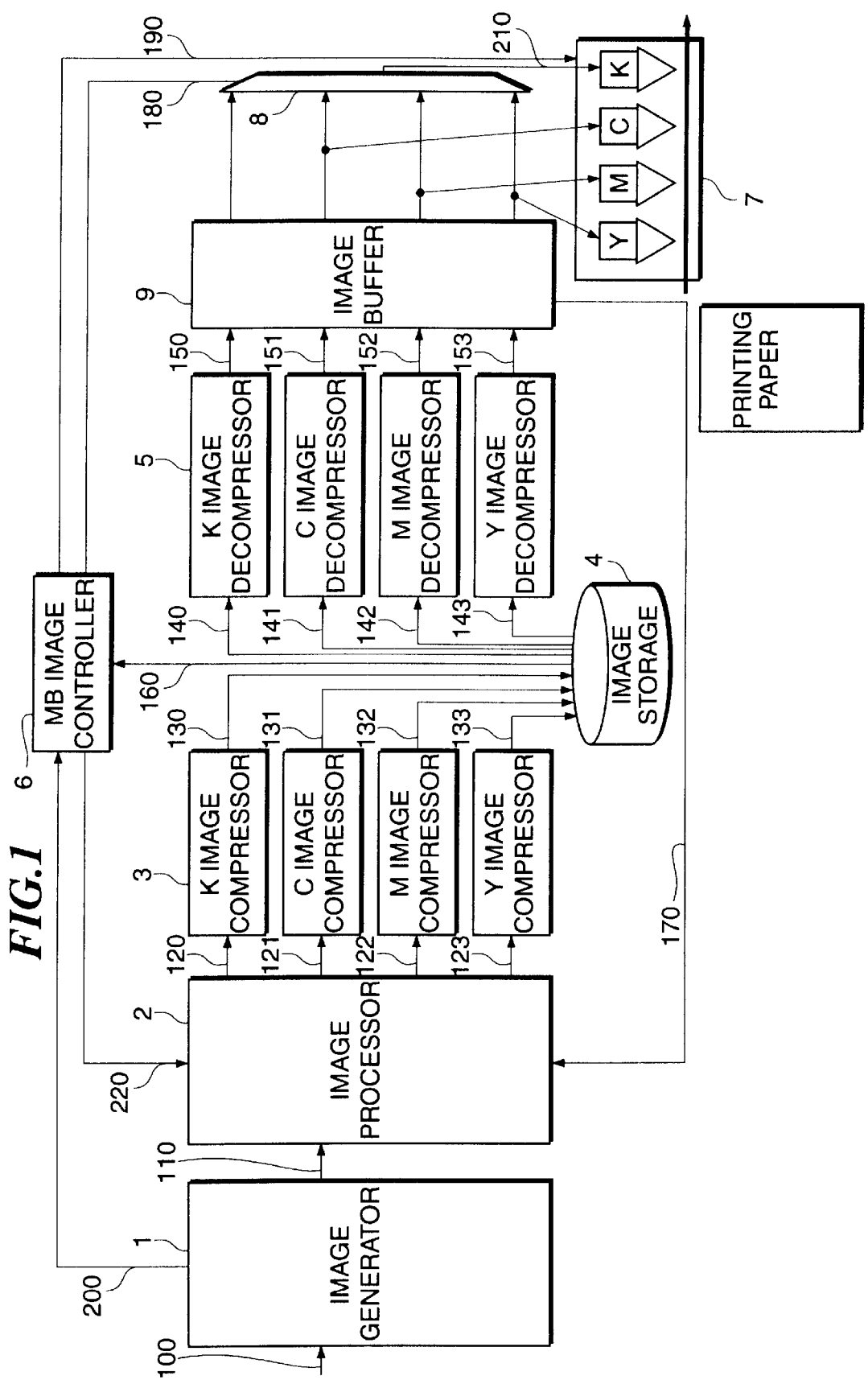
FIG. 1 is a block diagram showing the configuration of an embodiment of the present invention.

An embodiment of an image forming device according to the present invention will be described below. FIG. 1 is a block diagram showing an embodiment of the present invention. As shown in FIG. 1, a reference number 1 denotes an image generator, 2 denotes an image processor, 3 denotes an image compressor, 4 denotes an image storage, 5 denotes an image decompressor, 6 denotes an MB image controller, 7 denotes a print head, 8 denotes an image coupler, 9 denotes an image buffer, 100 denotes input image data such as a PDL image file, 110 denotes generated image data, 120 to 123 respectively denote the processed data of an MB image of each K, C, M, Y component, 130 to 133 respectively denote the compressed data of an MB image of each K, C, M, Y component, 140 to 143 respectively denote the compressed data of an MB image sent to the image decompressors, 150 to 153 respectively denote MB image data respectively decompressed by the image decompressors 5, 160 denotes an MB image compressed data sending control signal, 170 denotes MB image data decompressed and fed back, 180 denotes an MB image coupling control signal, 190 denotes a process speed control signal, 200 denotes an image type signal, 210 denotes coupled image data and 220 denotes an MB control signal.

Each component of the image forming device shown in FIG. 1 will be further detailedly described. The image generator 1 generates image data 110 based upon data 100 such as PDL data. The image processor 2 divides input image data 110 into MB images, executes image processing and sends MB image data 123 to 120 of YMCK components. The above image processing includes scaling processing, color conversion processing and substitute processing. The image compressor 3 compresses and encodes an MB image and sends MB image compressed data 133 to 130 to the image storage 4. The MB image controller 6 sends each MB image compressed data 143 to 140 from the image storage 4 to the image decompressors 5 based upon an image type signal 200 from the image generator 1 according to an MB image compressed data sending control signal 160. The image decompressor 5 decompresses the corresponding MB image compressed data and sends MB image decompressed data 153 to 150 to the print head 7 via the image buffer 9. The image coupler 8 receives an MB image coupling control signal 180 from the MB image controller 6, couples the MB image decompressed data 153 to 150 and sends one coupled image data 210 to the print head 7. The print head 7 receives a process speed control signal 190 from the MB image controller 6 and executes printing processing.

The operation of this embodiment will be described below based upon the above configuration. First, a case that the image generator 1 that interprets input PDL data sends a monochromatic image will be described.

If it is determined by the image generator 1 that a monochromatic image is input, the image generator 1 informs the MB image controller 6 that monochromatic image processing should be executed in the form of an image type signal 200. The MB image controller 6 sends an MB control signal 220 to the image processor 2 in the case of monochromatic image processing. The image processor 2 divides an image according to the MB control signal 220, generates MB images, applies image processing described in PDL to the MB images and sends to the image compressor 3 according to the MB control signal. At this time, in the case of a monochromatic image, MB images are sent so that YMCK four image compressors 3 are operated in parallel. The image compressor 3 compresses every MB image and the image storage 4 stores it. If a hard disk and others are used for the image storage 4, a non-reciprocal encoding method such as JPEG in which high compression rate is expected is selected for a compressing method to guarantee a band. However, in this case, it is anticipated that compression rate is different for every characteristic of an MB image and decoding time is different for every MB image.

Compression rate is attached to data acquired by compressing an MB image by the image compressor 3 and is stored. The MB image controller 6 calculates a load of decoding (decoding time) based upon the compression rate attached to the MB image compressed data and allocates the MB image compressed data to the corresponding image decompressor 5 according to a schedule in which all MB image compressed data can be decoded in the shortest time using four image decompressors 5. For another control method, divided image compressed data may also be allocated based upon compression rate attached at real time, always monitoring a situation of expansion by the divided image decompressor 5 to remove the effect of an error in calculating decoding time.

If MB image data formerly processed and stored is required during image processing by the image processor 2, MB image compressed data stored by the MB image controller 6 is decompressed using the image decompressor 5 and the decompressed MB image data 170 is sent to the image processor 2.

MB images 153 to 150 acquired by spatially dividing a monochromatic image are sent to the image coupler 8 via the image buffer 9 for matching timing for coupling and are coupled at timing controlled by the MB image controller 6 by the image coupler 8. The print head 7 prints the coupled image on paper started and carried at process speed and timing controlled by the MB image controller 6.

At this time, if process speed in the print head 7 is within the limit of physical paper carrying speed or the limit of the operational speed of the recorders of each color component in the print head 7, it can be varied depending upon the information capacity of monochromatic images. For example, as the processing speed is approximately four times though the information capacity is double, compared with that of the data 35 MB of a normal color image of one color if the data 70 MB of a monochromatic image is input, the process speed can be doubled as a whole.

Figure 2:
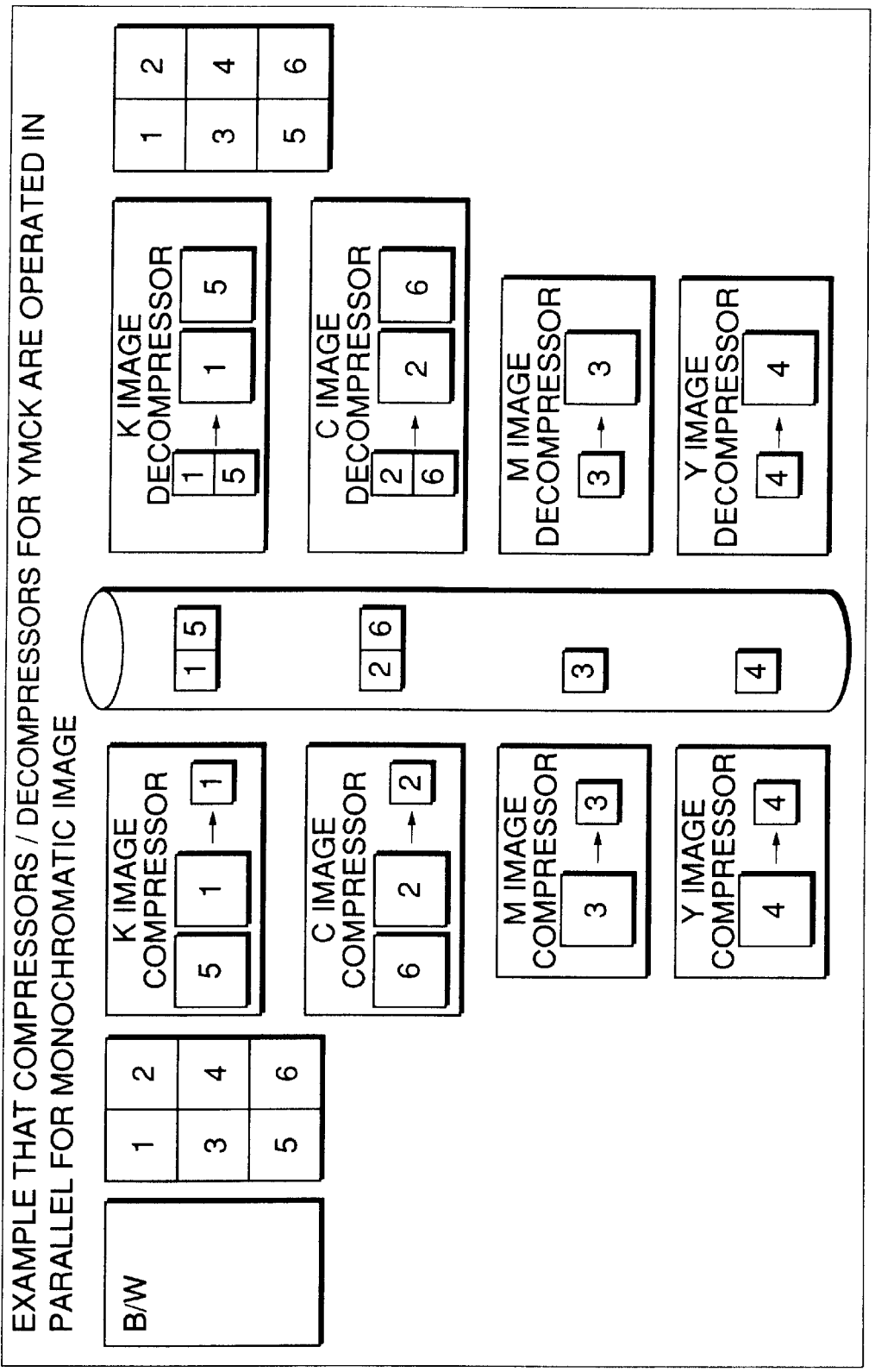
FIG. 2 illustrates an operation example of the present invention.

FIG. 2 shows an example that six MB images are sequentially received by the four image compressors 3 for YMCK and are compressed. The image compressors 3 for KCMY sequentially receive MB images. In this case, particularly adapted scheduling is not executed. That is, in expansion, the four image decompressors 5 for KCMY also sequentially receive six MB images and decompress them as in compression.

Figure 3:
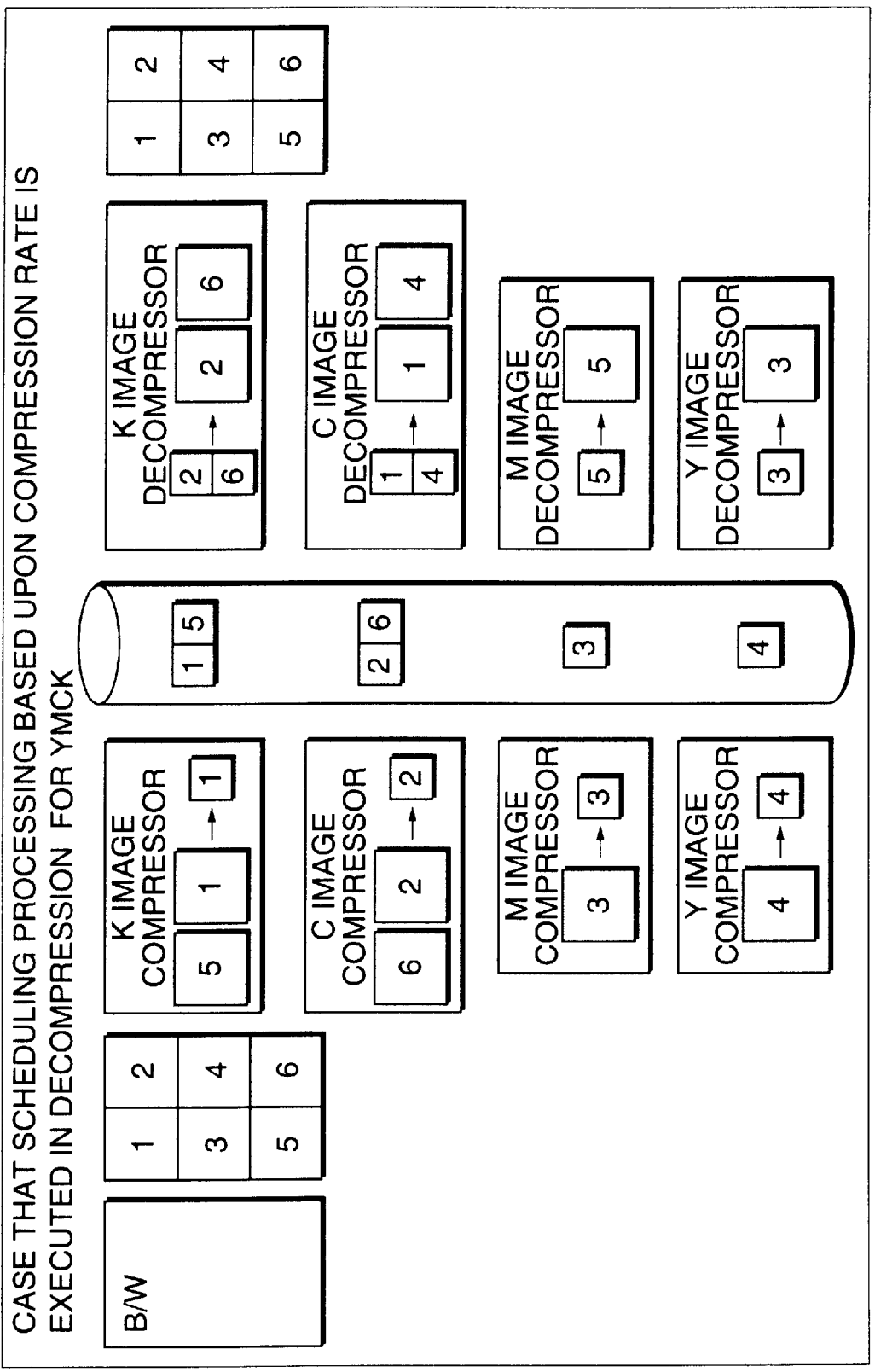
FIG. 3 illustrates another operation example of the present invention.
Figure 4:
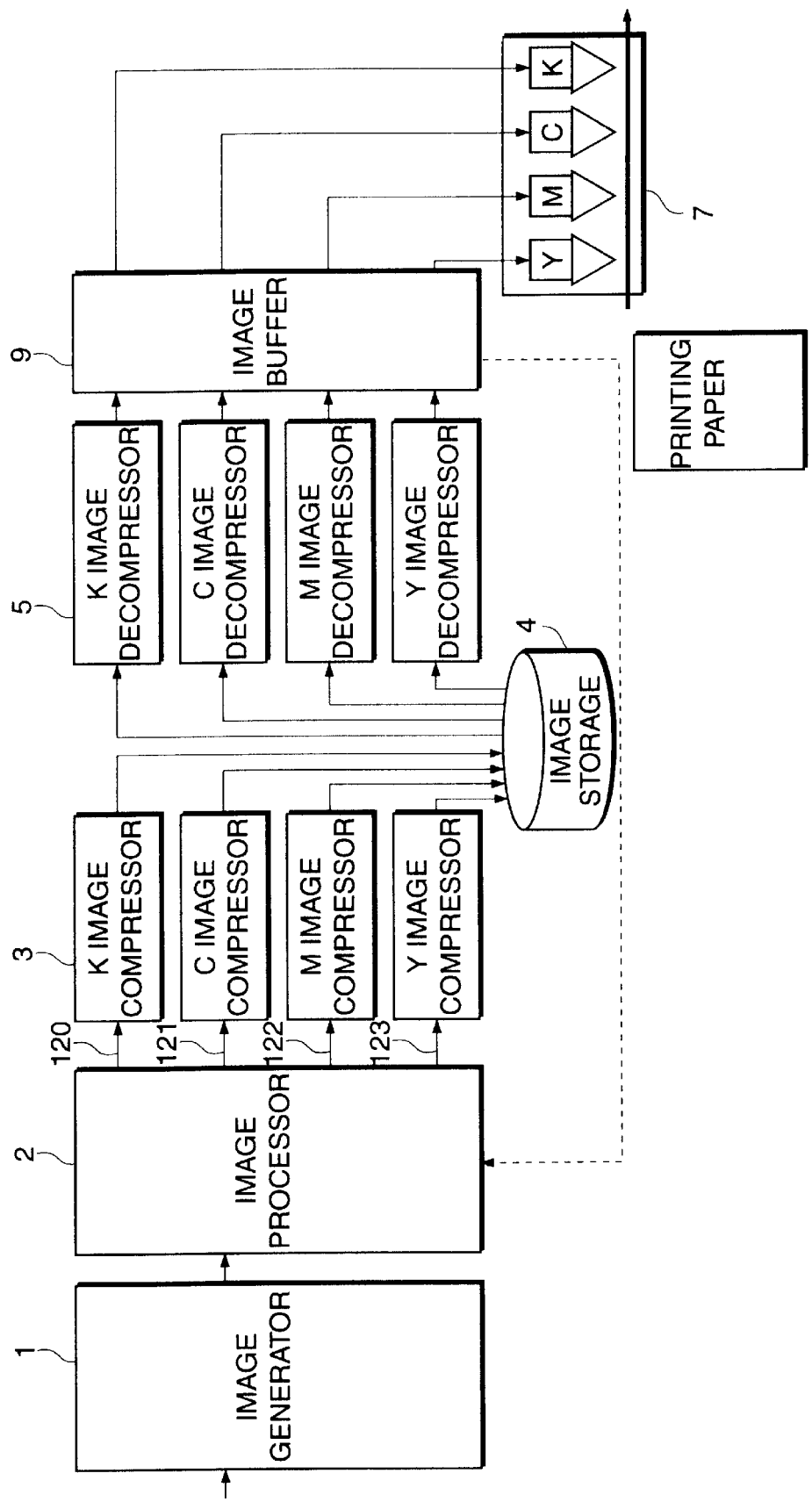
FIG. 4 is a block diagram showing the configuration of a general full color image printer according to a tandem system.
Figure 5:
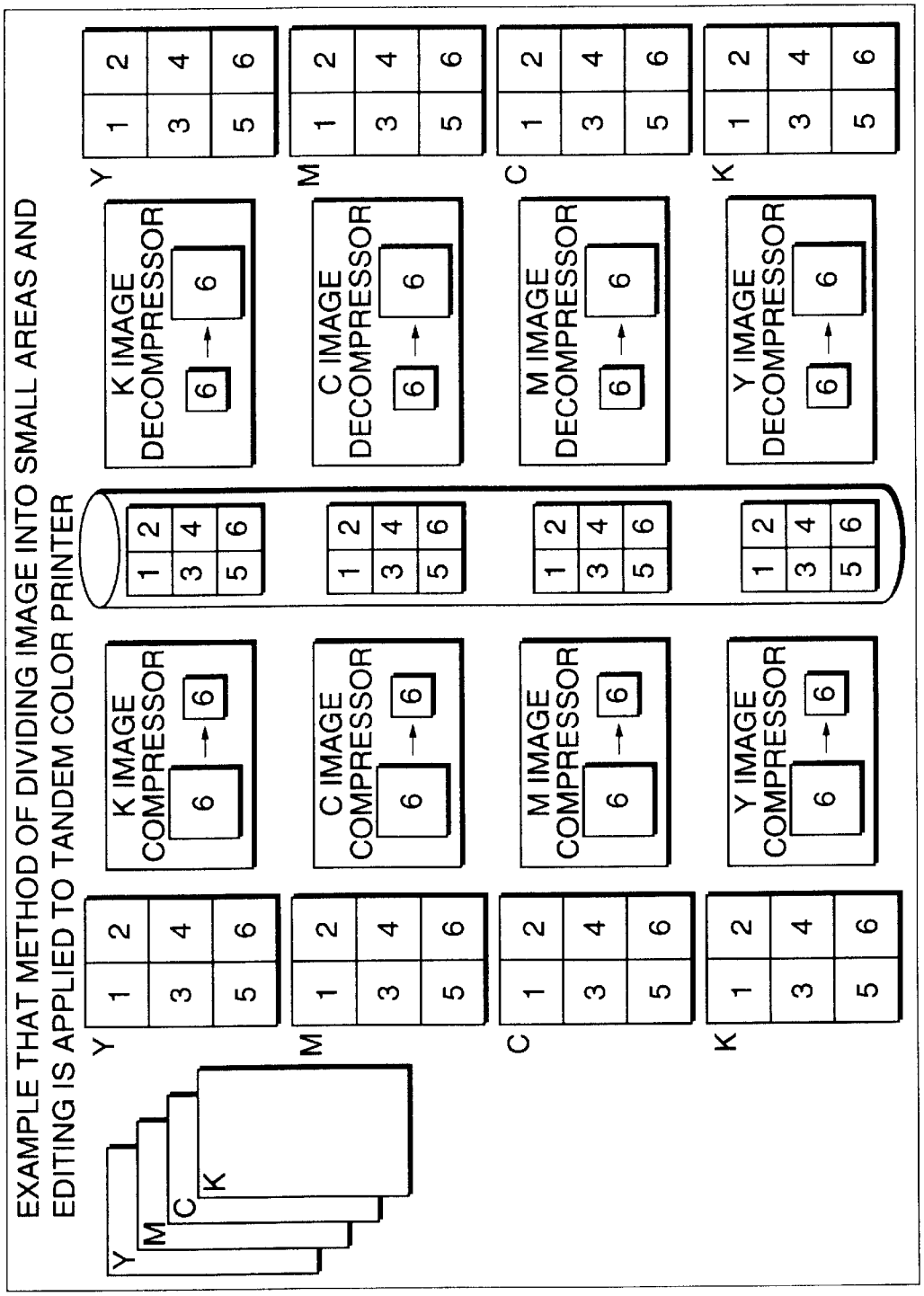
FIG. 5 illustrates MB in an example of a prior art.

FIG. 3 shows an example that scheduling is adaptably executed based upon compression rate and others. In compression, the four image compressors 3 for KCMY sequentially compress MB images (1) to (6) as in the example shown in FIG. 2. In expansion, the dispatch of an MB image is adaptably controlled referring to the compression rate and others of each MB image and in the example shown in FIG. 3 for example, MB images (2) and (6) are allocated to the image decompressor 5 for K, MB images (1) and (4) are allocated to the image decompressor 5 for C, an MB image (5) is allocated to the image decompressor 5 for M and an MB image (3) is allocated to the image decompressor 5 for Y.

Printing image data of K has been described above.

Next, a case that a color image is input will be described. For a color image, each color component is independently processed. Compression processing and expansion processing for every MB image are also executed every component. Difference among the decoding time of each color component is absorbed in the image buffer 9 and printing is executed by the print head 7. When difference among the decoding time cannot be absorbed because of the limit of the capacity of the image buffer 9, the MB image controller 6 delays the process speed of the print head 7 via a process control signal 190 beforehand.

In FIG. 1, the output of the image coupler 8 is supplied to the recorder for K, however, it is needless to say that the output of the image coupler may also be supplied to the recorder for other color components.

As clear from the above description, according to the present invention, in a full color image printer according to a tandem system, the processing speed of a monochromatic image can be enhanced effectively utilizing a color image processing hardware resource without adding large hardware. Process speed can be regulated depending upon the information capacity of a monochromatic image and it is clear that if the data 70 MB of a monochromatic image having the same size and resolution as the data 140 MB of a color image of four colors having A4 size and the resolution of 600 dots/25.4 mm according to JIS for example is input, the process speed can be doubled and the reduction of the cost and high processing speed can be balanced.

What is claimed is:

1. An image forming device capable of printing a full color image, comprising:

an image processor that converts an image to a final printout image in units of small area;

plural image compressors that receive the image in the units of small area from the image processor and compress it;

an image storage that stores the compressed image transferred from the image compressor;

plural image decompressors that decompress the compressed image in the units of small area stored in the image storage;

a temporary image storage that temporarily stores the image decompressed by the image decompressor;

a print head that prints the image stored in the temporary image storage by recorders corresponding to respective color components; and a small area image transfer controller that allocates and transfers the image in the units of small area transferred from the image processor to the plural image compressors and allocates and transfers the compressed image stored in the image storage to the plural image decompressors in the units of small area according to determination depending upon whether the image is a monochromatic image or a full color image, wherein:

the small area image transfer controller controls the transfer of the image in the units of small area, if the image to be printed is a full color image, so that each of the plural image compressors corresponding to its color component compresses the image in units of small area for the color component, and further, each of the plural image decompressors corresponding to the color component decompresses it, and controls the transfer of the image in the units of small area, if the image to be printed is a monochromatic image, so that the plural image compressors compress the monochromatic image in units of small area in parallel and further, the plural image decompressors decompress it in parallel.

2. The image forming device according to claim 1, wherein:
the small area image transfer controller calculates time required for decompressing data based upon a compression rate of data compressed by the image compressor; and
the small area image transfer controller allocates and transfers to the plural image compressors an image in units of small area stored so that time required for decompressing the whole image by the image decompressor is minimum.

3. The image forming device according to claim 1, wherein:
the small area image transfer controller monitors a situation in which data is decompressed by the plural image decompressors; and
the small area image transfer controller transfers the stored image in units of small area to one of the image decompressors which is not operating.

4. The image forming device according to claim 1, wherein:
the small area image transfer controller determines the size of the image of small area that equalizes an decompressing load of the plural image decompressors; and
the small area image transfer controller informs the image processor of the determined size.

5. The image forming device according to claim 1, wherein:
the small area image transfer controller determines an amount of codes that equalizes a load of expansion by the plural image decompressors; and
the small area image transfer controller informs the image compressor of the determined amount of codes and controls the amount of codes by the determined amount of codes.

6. The image forming device according to claim 4, wherein:
the small area image transfer controller sequentially sends the compressed image in units of small area to the plural image decompressors in order in which the image is to be output.

7. The image forming device according to claim 1, wherein:
the size of the small area to which image processing is applied by the image processor varies depending upon processing.

8. The image forming device according to claim 1, wherein:
the small area image transfer controller calculates a shortest decoding time for a plurality of compressed small area images based upon a compression rate of each of the compressed small area images,
the small area image transfer controller calculates an enhanced process speed corresponding to the shortest decoding time,
the small area image controller allocates each of the compressed small area images to one of the plural image decompressors according to a schedule whereby the compressed small area images are decoded in the shortest decoding time using the plural image decompressors, and
the small area image transfer controller sets the process speed of the print head.

9. The image forming device according to claim 1, wherein:
the small area image transfer controller calculates at least one value selected from a set of values consisting of a first value, a second value, a third value, a fourth value and a fifth value,
the small area image transfer controller calculates an enhanced process speed based upon the selected values, and
the small area image transfer controller sets the process speed of the print head,
wherein, the first value is a monitored time in which a divided image is decompressed by the image decompressor,
wherein, the second value is a size of a small area for which each image decompressor decodes each small area in a same decoding time,
wherein, the third value is the amount of codes for which each image decompressor decodes each small area in a same decoding time,
wherein, the fourth value is a decoding time of each image decompressor, and
wherein, the fifth value is a capacity of the temporary image storage.

10. An image forming device that can print a full color image, comprising:
an image processor that converts an image to a final printout image in units of small area;
an image compressor that receives the image in the units of small area from the image processor and compresses it;
an image storage that stores the compressed image transferred from the image compressor;
plural image decompressors that decompress the compressed image stored in the image storage in the units of small area;
a temporary image storage that temporarily stores the image decompressed by the image decompressor;
a print head that prints the image stored in the temporary image storage by recorders corresponding to respective color components; and
a small area image transfer controller that allocates and transfers the compressed image stored in the image storage to the plural image decompressors in the units of small area according to determination depending upon whether an image is a monochromatic image or a full color image, wherein:
the small area image transfer controller controls the transfer of the image in the units of small area, if the image to be printed is a full color image, so that each of the plural image decompressors corresponding to its color component decompresses the image in units of small area for the color component, and controls the transfer of the image in the units of small area, if the image to be printed is a monochromatic image, so that the plural image decompressors decompress the monochromatic image in units of small area in parallel.

11. An image forming device that can print a full color image, comprising:

an image processor that converts an image to a final printout image in units of small area;

plural image compressors that receive the image in the units of small area from the image processor and compress it;

an image storage that stores the compressed image transferred from the image compressor;

an image decompressor that decompresses the compressed image stored in the image storage in the units of small area;

a temporary image storage that temporarily stores the image decompressed by the image decompressor;

a print head that prints the image stored in the temporary image storage by recorders corresponding to respective color components; and a small area image transfer controller that allocates and transfers the image in the units of small area transferred from the image processor to the plural image compressors according to determination depending upon whether an image is a monochromatic image or a full color image, wherein:

the small area image transfer controller controls the transfer of the image in the units of small area, if the image to be printed is a full color image, so that each of the image compressors corresponding to its color component compresses the image in units of small area for the color component, and controls the transfer of the image in the units of small area, if the image to be printed is a monochromatic image, so that the plural image compressors compress the monochromatic image in units of small area in parallel.

* * * * *